Aug. 11, 1970     A. O. HUNT ET AL     3,523,466

MECHANICAL TRANSMISSIONS

Filed Oct. 6, 1967

United States Patent Office 3,523,466
Patented Aug. 11, 1970

3,523,466
MECHANICAL TRANSMISSIONS
Anthony Owen Hunt and Alan Edward Harrison, Leeds, England, assignors to Powder Couplings Limited, Leeds, England, a British company
Filed Oct. 6, 1967, Ser. No. 673,364
Claims priority, application Great Britain, Oct. 7, 1966
44,984/66
Int. Cl. F16f 9/30
U.S. Cl. 74—574
13 Claims

ABSTRACT OF THE DISCLOSURE

A torsional vibration damper for a rotary shaft comprising a housing member of circular transverse cross-section and a concentric plate member or the like mounted within and for rotation relative to said housing member, one of said members being adapted to be driven by the shaft and the other member being rotatable independently of said shaft, with the housing member containing a charge of solid particulate matter, so that torque can be transmitted through the aforesaid charge between the plate member and the housing member when the charge is centrifugally distributed within the housing member.

---

Figure 1:
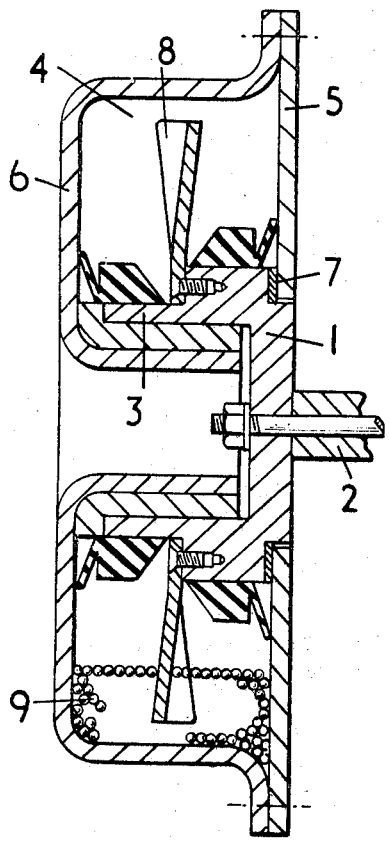

This invention relates to torsional vibration dampers for rotary shafts, especially the crankshafts of internal combustion engines.

According to the invention, there is provided a torsional vibration damper for a rotary shaft comprising a housing member of circular transverse cross-section and a concentric plate member mounted within the housing member for relative rotation thereto, means operably connecting one of said members to the shaft to be driven thereby and means mounting the other member to be rotatable independently of said shaft, and a charge of solid particulate within the housing member, so that torque can be transmitted through the aforesaid charge between the plate member and the housing member when the charge is centrifugally distributed within the housing member.

The damper according to the present invention can, in general, be constructed relatively cheaply, the process of charging the damper with a transmission material (such as metal shot) is not too critical, the damper is hardly, if at all, affected by any of the changes in temperature likely to be encountered in practice and the charge itself, in association with the other parts of the damper, can constitute a self contained fly-wheel for the respective shaft.

Moreover, with limits, the mass of this fly-wheel can bme varied as desired simply by varying the amount of charge or the nature of the charge; and the desired range of operating characteristics can be provided for by varying, inter-alia, the particle size of the charge.

Dampers according to the present invention have, in general, a reduced tendency to heat-up. It is in this connection a valuable feature of the invention that the damper can be sealed in, that is to say, it can be located within an envelope sealed to the respective shaft at each side of the damper. This feature is of particular utility when it is desired to locate the damper within the crank-case of an internal combustion engine. All possibility of losing shot or charge is thereby precluded. If it was felt to be desirable, a breather aperture could be provided in this envelope which would normally take the form of a metal shell or casing, with the breather aperture being of course smaller than the particle size of the torque-transmitting charge.

The plate member to which reference has been made may take the form of a metal ring secured to a concentric boss, which ring may either be flat or fluted or otherwise provided with projections. If desired, instead of what may literally be described as a ring, the plate within the housing of the damper may be replaced by any other suitable structure which will be partly or completely immersed in the centrifugally distributed charge. For example, the plate may be replaced by a row of spokes or by an open-work cage.

Another factor which may reduce the cost of a damper in accordance with the invention is that the housing of the damper need not be finned.

Figure 2:
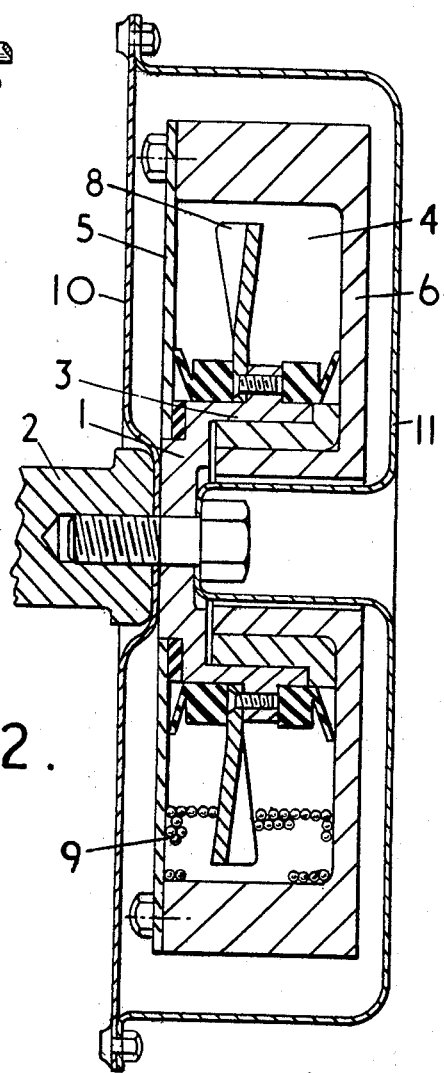

In order that the invention may be well understood, two embodiments thereof will now be described with reference to the accompanying drawings in which:

FIG. 1 is a view in cross-section through one damper according to the invention; and FIG. 2 is a view in cross-section through another device provided with an outer envelope.

Referring now to the drawings, a damping device comprises a circular member 1 rigidly attached to a shaft 2 of the rotary machine which it is desired to damp or detune. An annular part 3 of circular member 1 is disposed within a circular housing 4 formed of plate 5 and casting 6.

Circular member 1 and housing 4 are so constructed that housing 4 is readily rotatable with respect to circular member 1 by means of a bearing formed between the inside of the bellow boss of circular member 1 and the inside of the inner radial wall of housing 4. An annular washer 7 is located between plate 5 and the boss of circular member 1. Circular member 1 is provided with radially extending fins 8 which are attached to annular part 3 of circular member 1. The interior of the housing 4 is partially filled with metal shot 9.

Referring now to FIG. 2 of the drawings, the damping device is provided with a stamped metal envelope comprising two parts 10 and 11 which are rigidly attached, as shown, to crankshaft 2.

In operation, when crankshaft 2 is commenced to rotate, the centrifugal force caused by the rotary action of circular member 1, when a sufficiently high rotational speed has been achieved, causes metal shot 9 to move to the radial outer part of housing 4 and thus into contact with the radial outer wall of housing 4. The metal shot 9 then serves to transmit a rotational force from fins 8 to housing 4, thus causing the latter to rotate.

Depending on the actual speed of rotation, the metal shot 8 will be more or less tightly held against the outer radial wall of housing 4, and it will be thus less or more difficult for fins 8 to pass through the metal shot and move relatively to housing 4; in other words, the metal shot acts as a form of mechanical fluid and, as the speed of rotation increases, the viscosity of the mechanical fluid also increases.

Thus, the device will serve to damp fluctuations in the rotational speed of crankshaft 2, since any sudden increase in speed will increase the viscosity of the mechanical fluid formed by the metallic shot and hence tend to exert a restraining force on fins 8, opposing the sudden increase in speed. Conversely, a sudden decrease in the speed of rotation of crankshaft 2 will result in a decrease in the viscosity of the mechanical fluid formed by metallic shot 9 and hence allow an easier passage for fins 8, thereby decreasing a resistance to rotation exerted by the damping device and tending to counter a sudden decrease in rotational speed of crankshaft 2.

It will, of course, be understood that housing 4 will generally be of relatively heavy construction i.e. in order to obtain a relatively high damping force, with the housing 4 having a relatively high moment of inertia; this may be achieved, for example, by forming casting 6 so that the outer radial wall of the housing is considerably thicker, and heavier, than the inner radial wall (see FIG. 2).

We claim:

1. A torsional vibration damper for a rotary shaft comprising a free running outer rotary member and a concentric inner member for rotation relative thereto, means operably connecting said inner member to the shaft to be driven thereby and means mounting the rotary member to be rotatable independently of said shaft, and a charge of solid particulate matter within the rotary member and in direct friction transmitting contact with the said members, so that torque can be transmitted through the aforesaid charge between the inner member and the rotary member when the charge is centrifugally distributed within the rotary member.

2. The damper as claimed in claim 1 in which the concentric inner member is connected to one end of the rotary shaft.

3. The damper as claimed in claim 1 wherein the solid particulate matter is metal shot.

4. The damper as claimed in claim 1 which is sealed in an envelope sealed to the shaft at each side of the damper.

5. The damper as claimed in claim 1 in which the inner concentric member includes a metal ring secured to a concentric boss.

6. The damper as claimed in claim 5 in which the ring is flat.

7. The damper as claimed in claim 9 in which the housing member is defined by an annular trough closed by an annular plate.

8. The damper as claimed in claim 7 in which the plate member is provided with a hollow boss, with the inner radial wall of the annular trough of the housing bearing against the inner wall of the boss.

9. A torsional vibration damper for a rotary shaft comprising a housing member of circular transverse cross-section and a concentric plate member mounted within said housing member for rotation relative thereto, means operably connecting one of said members to the shaft to be driven thereby and means mounting the other member to be rotatable independently of said shaft, a charge of solid particulate matter within the housing member, so that torque can be transmitted through the aforesaid charge between the plate member and the housing member when the charge is centrifugally distributed within the housing member, an envelope sealed to the shaft at each side of the damper within which the damper is located and said envelope being provided with a breather aperture.

10. A torsional vibration damper for a rotary shaft comprising a housing member of circular transverse cross-section and a concentric plate member mounted within said housing member for rotation relative thereto, means operably connecting one of said members to the shaft to be driven thereby and means mounting the other member to be rotatable independently of said shaft, a charge of solid particulate matter within the housing member, so that torque can be transmitted through the aforesaid charge between the plate member and the housing member when the charge is centrifugally distributed within the housing member, said concentric plate member including a concentric boss, a metal ring secured to said concentric boss, and projections for said ring.

11. A torsional vibration damper for a rotary shaft comprising a housing member of circular transverse cross-section and a concentric plate member mounted within said housing member for rotation relative thereto, means operably connecting one of said members to the shaft to be driven thereby and means mounting the other member to be rotatable independently of said shaft, a charge of solid particulate matter within the housing member, so that torque can be transmitted through the aforesaid charge between the plate member and the housing member when the charge is centrifugally distributed within the housing member, said concentric plate member including a concentric boss and a fluted metal ring secured to said concentric boss.

12. A torsional vibration damper for a rotary shaft comprising a housing member of circular transverse cross-section and a concentric plate member mounted within said housing member for rotation relative thereto, means operably connecting one of said members to the shaft to be driven thereby and means mounting the other member to be rotatable independently of said shaft, a charge of solid particulate matter within the housing member, so that torque can be transmitted through the aforesaid charge between the plate member and the housing member when the charge is centrifugally distributed within the housing member, and said plate member being defined by a row of spokes.

13. A torsional vibration damper for a rotary shaft comprising a housing member of circular transverse cross-section and a concentric plate member mounted within said housing member for rotation relative thereto, means operably connecting one of said members to the shaft to be driven thereby and means mounting the other member to be rotatable independently of said shaft, a charge of solid particulate matter within the housing member, so that torque can be transmitted through the aforesaid charge between the plate member and the housing member when the charge is centrifugally distributed within the housing member, and said plate member including an open-work cage.

References Cited

UNITED STATES PATENTS

| | | | |
|---|---|---|---|
| 2,265,340 | 12/1941 | Bond | 188—218 |
| 2,269,966 | 1/1942 | Wemp | 74—574 |
| 2,641,940 | 6/1953 | White | 188—1 |
| 3,120,882 | 2/1964 | Maloney | 188—218 |
| 3,190,422 | 6/1965 | Burckhardt | 74—574 |
| 3,378,115 | 4/1968 | Stephens | 74—574 |

WESLEY S. RATLIFF, JR., Primary Examiner